S. TAMURA AND M. WATANABE.
SUPPORTING APPARATUS FOR THE REAR WHEEL SHAFT OF A MOTOR CAR.
APPLICATION FILED AUG. 1, 1918.

1,388,389.

Patented Aug. 23, 1921.
3 SHEETS—SHEET 1.

S. TAMURA AND M. WATANABE.
SUPPORTING APPARATUS FOR THE REAR WHEEL SHAFT OF A MOTOR CAR.
APPLICATION FILED AUG. 1, 1918.

1,388,389.

Patented Aug. 23, 1921.

S. TAMURA AND M. WATANABE.
SUPPORTING APPARATUS FOR THE REAR WHEEL SHAFT OF A MOTOR CAR.
APPLICATION FILED AUG. 1, 1918.
1,388,389.
Patented Aug. 23, 1921.
3 SHEETS—SHEET 3.
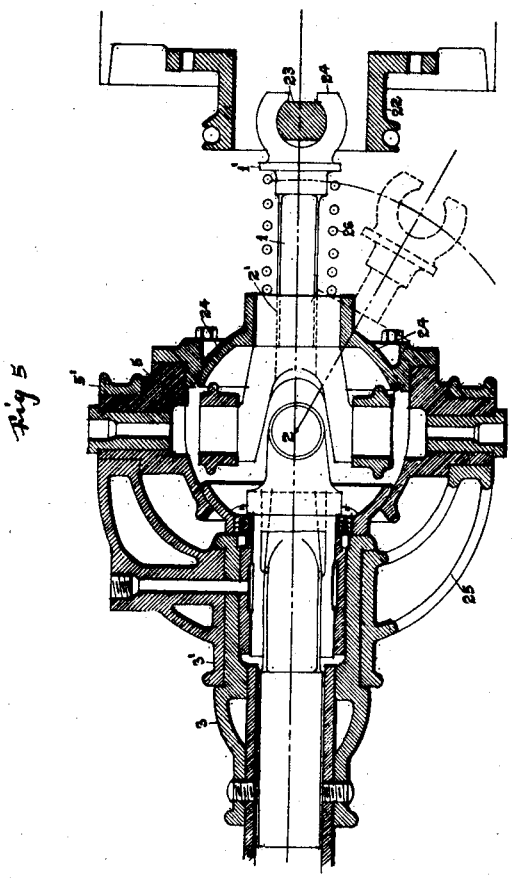

UNITED STATES PATENT OFFICE.

SHINKICHI TAMURA, OF KOBE, AND MASANORI WATANABE, OF TOKYO, JAPAN; SAID WATANABE ASSIGNOR TO SAID TAMURA.

SUPPORTING APPARATUS FOR THE REAR-WHEEL SHAFT OF A MOTOR-CAR.

1,388,389.  Specification of Letters Patent.  Patented Aug. 23, 1921.

Application filed August 1, 1918. Serial No. 247,883.

*To all whom it may concern:*

Be it known that we, SHINKICHI TAMURA and MASANORI WATANABE, subjects of the Emperor of Japan, and the former residing at No. 11 Nakayamate-Dori, Gochome, Kobe, Japan, the latter at No. 39, Takecho, Shitaya, Tokyo, Japan, have invented certain new and useful Improvements in Supporting Apparatus for the Rear-Wheel Shaft of a Motor-Car, of which the following is a specification.

This invention relates to a supporting apparatus for the rear axle of a motor car, wherein the hanger of the universal joint may be shifted relative to the points of support of the thrust shafts at both sides of the frame. The invention has as its object to avoid any transverse stress upon the supporting parts for the rear axle even when one of the rear wheels is moved vertically relative to the other.

Briefly, this invention relates to a supporting apparatus for the rear axle casing of a motor car, which insures of the elimination of a concentrated strain on any one part and at the same time is constructed so that it may be readily connected to or disconnected from the car as a unit. Therefore it will result in greatly increasing the life of the supporting apparatus and of greatly facilitating its cleaning, repairing, etc.

The invention is clearly illustrated in the accompanying drawings, in which:—

Fig. 5, is a sectional view showing the universal joint and the connection between the propeller shaft and universal joint.

Figure 1:
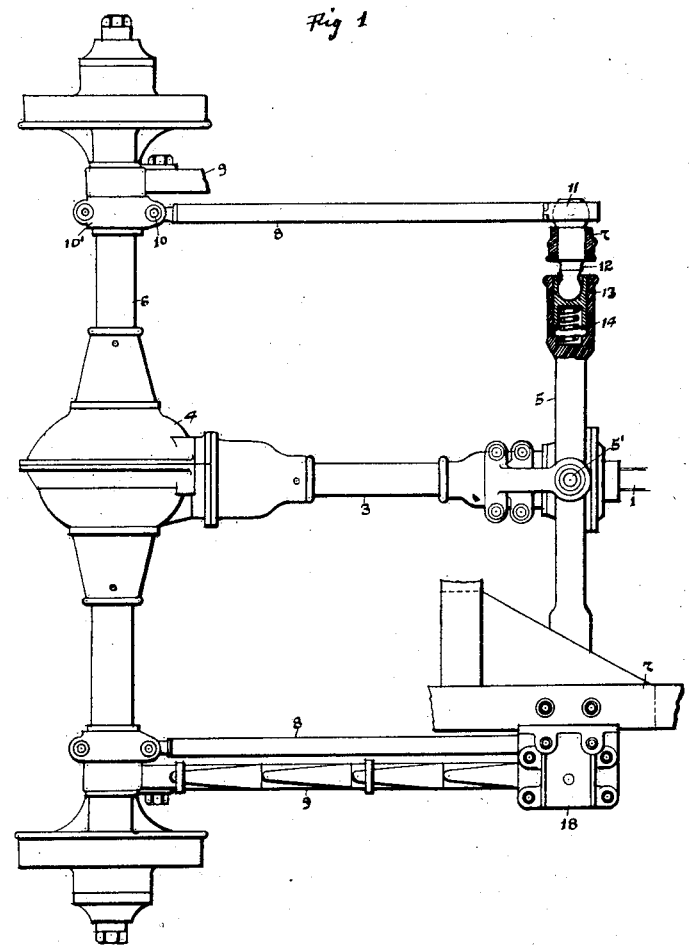
Figure 1, is a plan view of an apparatus according to this invention.
Figure 2:
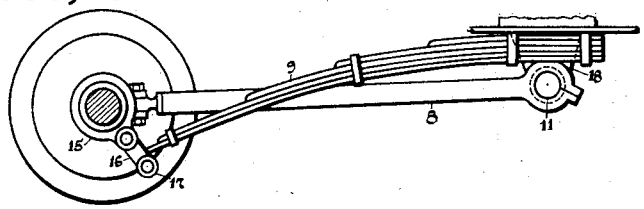
Fig. 2, is a side view thereof.

Referring now more particularly to Figs. 1 and 2, there is provided a counter shaft 1 which transmits power to a propeller shaft 2 within a sleeve 3 through a universal joint which is supported by or arranged within a hanger 5 therefor. The universal joint within the hanger 5 coacts with another joint of special construction which is connected to a prime mover through the shaft 1, so that they may swing freely by their mutual engagement. The parts will be hereinafter more fully described.

Suitable gearing 4 is provided through which power is transmitted to the rear wheel shaft which passes through the rear axle casing 6. Fixed brackets on the frame 7 are so arranged that the axis will be coincident with the horizontal axis of the universal joint. The frame 7 is connected with the universal joint through the hanger 5 as will be hereinafter more fully described. Shafts 8 are provided for transmitting thrust from the rear axle to the body, and one end 10 of each thrust shaft is connected to a member 10' which is rotatably fitted to the rear axle housing 6 for horizontal swinging movement with relation to the said member 10'. It will thus be seen that the thrust shafts may be rocked in both horizontal and vertical directions. The other end of each shaft 8 is supported by the spherical bearing of the adjacent member 12, rigidly fixed to the stationary frame 7 so that the inner end of each shaft 8 is somewhat distorted. Therefore, as a result, the rear axle housing 6 may be moved in any direction as well as subjected to some distortion with relation to the frame 7 through the said shafts 8. The members 12 and their elements which coact therewith to form the important feature of the present invention may be constructed as follows:—

Each end of the hanger for the universal joint is provided with a hollow enlargement into which a member 13 is slidably arranged; between the inner end of the slidable member and a recess in the hanger 5, a compression spring 14 is arranged. The outer extremity of each member 13 is formed with a concaved spherical recess in which the spherical inner end of the adjacent member 12 is inserted so that the hanger 5 may be shifted transversely with respect to the said member 12. Therefore, the hanger 5 has horizontal displacement relative to the body and a vertical rocking movement around the normal axis, which is the center line of the bracket 7 of the universal joint. Moreover, between the hanger 5 and the sleeve 3 of the propeller shaft 2 there is a forked connection 25, the forked end of which is connected to a pin 5' projecting from the center of the hanger 5 so that the said forked member 25 may be rocked around the pin 5' and coincide with the vertical center of the universal joint while the other end of the member 25 is pivoted to the sleeve and may be rotated on a cylindrical surface 3' thereon.

Summarizing the above description it is apparent that the rear wheel and the housing 6 may be moved in various directions and also subjected to somewhat free distortion under the control of the pair of thrust shafts 8 within a constant distance of the frame 7. At the same time, the sleeve for the propeller shaft, which is integral with or rigidly fixed to the housing 6, will receive little or no stress owing to the resultant motion of the hanger 5 and the forked member 25, while the normal axis of the universal joint is never deflected from the axis of the sides of the frame 7, for any movement of the wheel shaft.

Springs 9 as shown in Fig. 2, each have one end 17 connected to the housing 6 by means of a strap 15 and a shackle 16. The other end 18 of each spring 9 is rigidly fixed to the car frame. These springs do not absorb the thrust shock as the latter is solely achieved by the shafts 8 through the frame 7, and consequently the springs 9 will merely cushion the load coming on the car. These springs however, swing freely owing to the shackles 16.

The effect of the above described construction under that shown in Fig. 3 as will be hereinafter described, is as follows:—

Suppose, during one of the most irregular and most frequent motions of the car, that is, when one of the wheels, for instance, the left, is raised relative to the other wheel, by a certain road resistance, then the rear axle will be moved in a special path conforming with the shafts 8 and around the point of contact of the other or right wheel upon the ground. Therefore, the gearing case 4 and the propeller shaft sleeve 3, which is rigidly fastened, must be displaced accordingly. The sliding surface between the forked member 25 and the propeller sleeve 3 is provided to eliminate torsional stress. Against the transverse component of upward rotation and of the rightward shifting motion of the universal joint which results from the above action, the spring 14 at the right is compressed and at the left expanded, so that the hanger will be shifted toward the right while freely rocking or rotating upward. If the construction of this part be rigid, an enormous stress occurs which frequently breaks down the parts. This invention therefore will cushion all the stresses and cause the action of the whole power transmission apparatus to work in a smooth manner.

Figure 3:
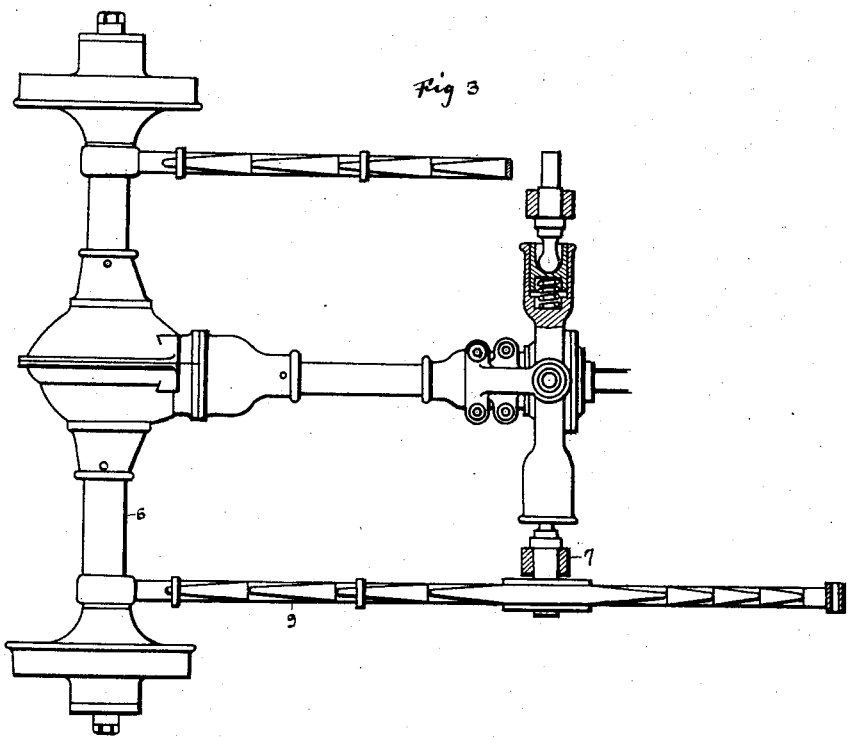
Fig. 3, is a plan view of a modified form of the apparatus according to this invention.
Figure 4:
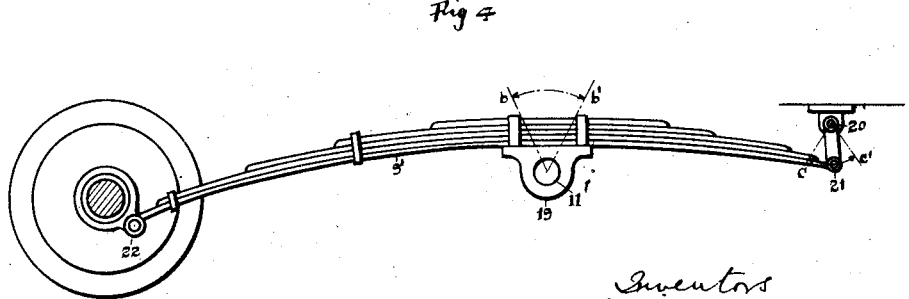
Fig. 4, is a side view of the forms shown in Fig. 3.

The apparatus shown in Figs. 3 and 4 is a modification of this invention, wherein the thrust rods or shafts 8 are omitted and the transmission of power is achieved by means of cushion springs 9'. In reducing this feature of the invention to practice, each cushion spring is rigidly fixed to a point 22 upon the rear axle housing and has its medial portion provided with a supporting member 19 which is rockably or loosely mounted on a shaft 11'. Each shaft 11' is arranged at the extremity of the adjacent member 12, as also shown in Figs. 1 and 2 and corresponds to the spherical part 11 thereof, but in the present instance is made cylindrical in cross section instead of being spherical. The frame part 7 is quite the same as that shown in Figs. 1 and 2. Therefore in this case, the frame 7 will support the weight of the rear part of the car body. The opposite end of each spring 9' is shackled to a fixed point 20. The remaining joints of this form are substantially in the form previously described.

By the construction of the modification, it is apparent that when the rear wheel shaft is caused to move upwardly near one end, spring 9' will be rocked around the axis, which is the horizontal centerline of the hanger 5, while the universal joint will move in harmony with the other parts of the apparatus and, at the same time, yield to and allow for the torsional strain of the wheel shaft. Moreover, the strain of this spring 9' due to its longitudinal disposition will be compensated upon the shackle 21. Both the springs 9' will work freely during transmission of the propelling power to the car.

In Fig. 5 there is shown the universal joint and the connection between it and the prime mover. The joint swings vertically on the surface 24 and horizontally on the surface 5. To the end 2' on the motor side of the joint, a squared portion of the shaft 1 is inserted. This shaft 1 is always pressed toward the motor side of the joint by means of a coiled spring 26 which is arranged between the collar 1' of the shaft 1 and the end 2' of the joint so that the shaft 1 cannot be disengaged from the position. The end of the shaft 1 on the motor side is provided with a forked part 24 which has a recess of partial spherical form. By means of this forked part, the shaft 1 is coupled to a projection 23 of the part 22 which is rotated directly or indirectly by the motor shaft. This projection 22 has a partial spherical form corresponding to the recess of the end 24 of the shaft 1, so that the shaft 1 may swing in all directions around the said joint or coupling. The shaft 1 may swing freely with respect to the motor, and in addition to that the universal joint may shift sidewise and rock vertically and, even though the central pin 2 of the universal joint and its hanger 5 are subjected conjointly to the vertical rocking or the sidewise shifting, the power will be safely transmitted to the wheel shaft. For instance, when the right hand rear wheel is raised or lowered by irregularity of the ground, the universal joint does not receive any bending or torsional stresses while transmitting power to the wheel shaft with the free swinging or rotating motion corresponding to that of the hanger 5.

The vibration of the motor is not transmitted to the parts from the shaft 1, so that these parts are perfectly prevented from receiving any strain. Moreover, the shaft 1 can be easily detached. In accomplishing this action, the shaft is placed toward the universal joint against the spring 26, and then the forked part 24 is disengaged from the fixed projection 23 and rocked at the certain angle around the axis of the center pin 2 of the joint. The shaft 1 may now be detached and accordingly the motor part and the part 24 as well as the projection 23 may be modified for accomplishing a similar purpose, but such modification is not a part of this invention.

It is believed in view of the foregoing description that a further detailed description of the operation of the invention is entirely unnecessary. Likewise it is believed that the advantages of the invention will be readily apparent.

Having thus fully described the invention what is claimed as new and desired to be secured by Letters Patent is:—

1. Supporting apparatus of the character described including in combination with the chassis, rear axle housing and propelling means for the rear wheels of a motor vehicle, a hanger having its ends universally connected with the sides of the chassis, a universal joint supported by the hanger and interposed in the driving shaft of the propelling means, thrust shafts between the end portions of the hanger and the rear axle housing and springs between the chassis and the rear axle housing.

2. A supporting apparatus as claimed in claim 1, wherein the hanger for the universal joint is designed to rock vertically around the axis at the connecting points of the thrust shafts, and in addition is designed to shift freely transversely, substantially as set forth.

3. Supporting apparatus as claimed in claim 1, wherein the thrust shafts at the sides of the chassis are flexible in all directions during operation of the parts and the cushion springs are independent of the thrust shafts and have their rear ends connected to the axle housing so that they can be rocked around the axis thereof, substantially as described.

4. A supporting apparatus as claimed in claim 1, wherein an intermediate power shaft is coupled to the end of the universal shaft of the propelling means and the universal joint so as to coact with the universal joint to permit free rocking movement in all directions, substantially as described.

In testimony whereof we have hereunto set our hands in presence of two subscribing witnesses.

SHINKICHI TAMURA.
MASANORI WATANABE.

Witnesses:
SUGAO SOGA,
HIKOTARO SAGAWA.